US011195139B1

(12) United States Patent
Choudhury et al.

(10) Patent No.: US 11,195,139 B1
(45) Date of Patent: *Dec. 7, 2021

(54) SUPPLY CHAIN VISIBILITY PLATFORM

(71) Applicant: FourKites, Inc., Chicago, IL (US)

(72) Inventors: Arunabha Choudhury, Kolkata (IN); Sriram Ragunathan, Chennai (IN); Jayakarthick Sathyanarayanan, Tamil Nadu (IN); Pritesh Jain, Mudhol Karnataka (IN); Ajay Hayagreeve Balaji, Chennai (IN); Abhineythri Venkataraman, Chennai (IN); Timothy Patrick Mullee, Chicago, IL (US)

(73) Assignee: FOURKITES, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/235,744

(22) Filed: Apr. 20, 2021

Related U.S. Application Data

(63) Continuation of application No. 16/925,306, filed on Jul. 9, 2020, now Pat. No. 11,017,347.

(51) Int. Cl.
*G06Q 10/08* (2012.01)
*G06F 16/29* (2019.01)

(52) U.S. Cl.
CPC ......... *G06Q 10/0833* (2013.01); *G06F 16/29* (2019.01); *G06Q 10/0838* (2013.01); *G06Q 10/08355* (2013.01)

(58) Field of Classification Search
CPC ......... G06Q 10/0833; G06Q 10/08355; G06Q 10/0838; G06F 16/29
See application file for complete search history.

(56) References Cited

U.S. PATENT DOCUMENTS 531,860 A 1/1895 Rhodes
5,043,908 A * 8/1991 Manduley ........ G07B 17/00362
700/227

(Continued)

OTHER PUBLICATIONS

Reid Simmons et al., "Learning to Predict Driver Route and Destination Intent", published by 2006 IEEE Intelligent Transportation Systems Conference, on Sep. 17-20, 2006, all pages (Year: 2006).*

(Continued)

*Primary Examiner* — Omar Zeroual
(74) *Attorney, Agent, or Firm* — Polsinelli PC

(57) ABSTRACT

Systems, methods, and non-transitory media are provided for dynamically predicting visibility of freights in a constrained environment. An example method can include determining attributes associated with a load transported by a carrier from a source to a destination, the attributes including an identity of the carrier, an identity of an industry associated with the load, an identity of a shipper of the load, load characteristics, and/or a pickup time of the load; based on the attributes, predicting a route the carrier will follow when transporting the load to the destination, at least a portion of the route being predicted without data indicating an actual presence of the carrier within the portion of the route, the data including location measurements from a device associated with the carrier and/or a location update from the carrier; and generating a tracking interface identifying the route the carrier is predicted to follow.

18 Claims, 8 Drawing Sheets

(56) References Cited

U.S. PATENT DOCUMENTS

| | | | | |
|---|---|---|---|---|
| 5,072,400 | A | * | 12/1991 | Manduley ........ G07B 17/00435 700/226 |
| 5,122,959 | A | * | 6/1992 | Nathanson ............. G08G 1/202 340/993 |
| 5,414,809 | A | * | 5/1995 | Hogan ................... G06F 3/0481 715/765 |
| 5,422,821 | A | * | 6/1995 | Allen ........................ B07C 3/00 209/584 |
| 5,437,010 | A | * | 7/1995 | Blackman ........ G07B 17/00193 700/180 |
| 5,541,845 | A | * | 7/1996 | Klein ................... G01C 21/343 340/988 |
| 5,703,783 | A | * | 12/1997 | Allen ........................ B07C 3/00 209/584 |
| 5,802,492 | A | * | 9/1998 | DeLorme ........... G01C 21/3476 340/990 |
| 5,831,860 | A | * | 11/1998 | Foladare ................ G06Q 10/08 700/219 |
| 5,948,040 | A | * | 9/1999 | DeLorme ............. G09B 29/106 701/426 |
| 5,995,950 | A | * | 11/1999 | Barns-Slavin ......... G06Q 10/08 705/402 |
| 6,012,065 | A | * | 1/2000 | Boucher ............... G06F 9/4493 |
| 6,018,725 | A | * | 1/2000 | Boucher ................... G06F 8/60 705/401 |
| 6,064,995 | A | * | 5/2000 | Sansone ............. G07B 17/0008 382/101 |
| 6,571,213 | B1 | * | 5/2003 | Altendahl ............ G06Q 10/047 705/330 |
| 6,611,686 | B1 | * | 8/2003 | Smith ...................... G06Q 10/08 340/426.19 |
| 6,772,130 | B1 | * | 8/2004 | Karbowski ............ G06Q 10/08 705/26.1 |
| 6,879,962 | B1 | * | 4/2005 | Smith ................... G06Q 10/025 705/22 |
| 6,915,268 | B2 | * | 7/2005 | Riggs ................ G06Q 10/0631 705/7.37 |
| 6,976,007 | B1 | * | 12/2005 | Boucher ................ G06Q 10/08 705/28 |
| 7,058,614 | B1 | * | 6/2006 | Wesseling ........ G07B 17/00435 705/408 |
| 7,334,184 | B1 | * | 2/2008 | Simons ............... G06F 16/9535 715/234 |
| 8,131,651 | B1 | * | 3/2012 | Bennett ............ G06Q 10/06311 705/335 |
| 8,170,959 | B2 | * | 5/2012 | Willoughby .............. G09F 3/02 705/404 |
| 8,209,191 | B2 | * | 6/2012 | Cook ....................... H04L 51/14 705/1.1 |
| 8,260,647 | B2 | * | 9/2012 | Scott ...................... G06Q 10/06 705/7.13 |
| 8,380,641 | B1 | * | 2/2013 | Bennett ................ G06Q 10/063 705/335 |
| 8,428,870 | B2 | * | 4/2013 | Berry ...................... G06Q 10/06 701/410 |
| 8,767,072 | B1 | * | 7/2014 | Rosenwinkel ....... G06K 9/0063 348/148 |
| 9,008,685 | B1 | * | 4/2015 | Gold ..................... H04W 72/08 455/456.1 |
| 10,184,798 | B2 | * | 1/2019 | Sidhu ..................... G01C 21/16 |
| 10,324,463 | B1 | * | 6/2019 | Konrardy .................. G01S 19/14 |
| 10,447,589 | B2 | | 10/2019 | Bardhan et al. |
| 10,820,161 | B2 | * | 10/2020 | Levy ....................... H04B 17/27 |
| 11,017,347 | B1 | * | 5/2021 | Choudhury ...... G06Q 10/08355 |
| 11,037,091 | B2 | * | 6/2021 | Ladden .................. G06F 3/0484 |
| 11,037,322 | B2 | * | 6/2021 | Hildreth .................. A63B 24/0021 |
| 2001/0025268 | A1 | * | 9/2001 | Hnat ....................... G06Q 40/04 705/37 |
| 2001/0040513 | A1 | * | 11/2001 | McDonald ........ G07B 17/00024 340/8.1 |
| 2001/0044729 | A1 | * | 11/2001 | Pomerance .......... G06Q 50/182 705/309 |
| 2002/0019759 | A1 | * | 2/2002 | Arunapuram .......... G06Q 10/04 705/7.26 |
| 2002/0032573 | A1 | * | 3/2002 | Williams ............... G06Q 10/08 705/335 |
| 2002/0046191 | A1 | * | 4/2002 | Joao .................... G06Q 30/0283 705/400 |
| 2002/0065738 | A1 | * | 5/2002 | Riggs ................ G06Q 10/0833 705/334 |
| 2002/0099567 | A1 | * | 7/2002 | Joao ..................... G06Q 10/087 340/539.13 |
| 2002/0017785 | A1 | | 8/2002 | Melchior |
| 2002/0107785 | A1 | * | 8/2002 | Melchior ............... G06Q 20/10 705/37 |
| 2002/0115436 | A1 | * | 8/2002 | Howell ................. B60R 25/102 455/426.1 |
| 2002/0120475 | A1 | * | 8/2002 | Morimoto .............. G06Q 10/08 705/4 |
| 2002/0138656 | A1 | * | 9/2002 | Hickey .................... G06F 9/454 709/250 |
| 2002/0165729 | A1 | * | 11/2002 | Kuebert ............... G06Q 10/083 705/338 |
| 2002/0169542 | A1 | * | 11/2002 | Katayama ........... G06Q 10/047 701/428 |
| 2003/0033164 | A1 | * | 2/2003 | Fallings .................. G06Q 10/02 705/6 |
| 2003/0037009 | A1 | * | 2/2003 | Tobin ..................... G06Q 10/08 705/65 |
| 2003/0040944 | A1 | * | 2/2003 | Hileman ................ G06Q 10/08 705/5 |
| 2003/0046133 | A1 | * | 3/2003 | Morley ............... G06Q 10/0639 705/7.12 |
| 2003/0046589 | A1 | * | 3/2003 | Gregg ................. H04L 63/0823 726/5 |
| 2003/0078779 | A1 | * | 4/2003 | Desai ..................... H04M 3/4878 704/257 |
| 2003/0101143 | A1 | * | 5/2003 | Montgomery ... G07B 17/00435 705/62 |
| 2003/0167240 | A1 | * | 9/2003 | Napier ................... G06Q 10/08 705/404 |
| 2003/0169900 | A1 | * | 9/2003 | Woolston .......... G07B 17/00024 382/101 |
| 2003/0171962 | A1 | * | 9/2003 | Hirth ................ G06Q 10/06315 705/7.25 |
| 2003/0182052 | A1 | * | 9/2003 | DeLorme ............ G01C 21/3679 701/533 |
| 2003/0188660 | A1 | * | 10/2003 | Foth ................... G07B 17/00661 101/484 |
| 2004/0004119 | A1 | * | 1/2004 | Baldassari ............. G06Q 10/08 235/384 |
| 2004/0202154 | A1 | * | 10/2004 | Aklepi ................... G06Q 10/08 370/352 |
| 2004/0243452 | A1 | * | 12/2004 | Barton ................. G06Q 10/083 705/337 |
| 2004/0254808 | A1 | * | 12/2004 | Bennett ................. G06Q 30/04 705/26.1 |
| 2004/0264739 | A1 | * | 12/2004 | Das .................. G07B 17/00024 382/101 |
| 2005/0017899 | A1 | * | 1/2005 | Cervinka ................. H04W 4/029 342/357.31 |
| 2005/0038758 | A1 | * | 2/2005 | Hilbush ............ G06Q 10/06311 705/402 |
| 2005/0131576 | A1 | * | 6/2005 | De Leo .................. G08G 1/202 700/223 |
| 2005/0154626 | A1 | * | 7/2005 | Jones ................. G06Q 10/0631 705/7.12 |
| 2005/0171632 | A1 | * | 8/2005 | Witmond ............... G06Q 10/08 700/213 |
| 2005/0190717 | A1 | * | 9/2005 | Shu ......................... H04L 45/00 370/328 |
| 2005/0246359 | A1 | * | 11/2005 | Robbins ................. G06Q 10/08 |
| 2006/0122949 | A1 | * | 6/2006 | Poulin ................ G07B 17/00024 705/402 |
| 2006/0136237 | A1 | * | 6/2006 | Spiegel ................ G06Q 10/083 705/330 |
| 2006/0184403 | A1 | * | 8/2006 | Scott ................. G06Q 10/06316 705/338 |

(56) References Cited

U.S. PATENT DOCUMENTS

| | | | |
|---|---|---|---|
| 2006/0229895 A1* | 10/2006 | Kodger, Jr. | G06Q 10/08 705/333 |
| 2006/0235739 A1* | 10/2006 | Levis | G06Q 10/08 705/1.1 |
| 2006/0282277 A1* | 12/2006 | Ng | G06Q 10/0831 705/333 |
| 2007/0005452 A1* | 1/2007 | Klingenberg | G06Q 10/0835 705/334 |
| 2007/0156416 A1* | 7/2007 | Foth | G06Q 10/0835 705/336 |
| 2007/0156423 A1* | 7/2007 | Foth | G07B 17/00435 709/206 |
| 2007/0192216 A1* | 8/2007 | Arnold | G06Q 30/06 705/28 |
| 2007/0294028 A1* | 12/2007 | Gray | G01C 21/343 701/533 |
| 2007/0299686 A1* | 12/2007 | Hu | G06Q 20/20 705/407 |
| 2008/0004967 A1* | 1/2008 | Gillen | G06Q 20/209 705/24 |
| 2008/0004995 A1* | 1/2008 | Klingenberg | G06Q 10/083 705/28 |
| 2008/0061967 A1* | 3/2008 | Corrado | G06K 19/07345 340/539.26 |
| 2008/0091347 A1* | 4/2008 | Tashiro | G01C 21/30 701/448 |
| 2008/0129493 A1* | 6/2008 | Fuentes | G06Q 10/08 340/539.22 |
| 2009/0037095 A1* | 2/2009 | Jani | G06Q 10/0834 701/533 |
| 2009/0088974 A1* | 4/2009 | Yasan | G01C 21/28 701/469 |
| 2009/0094082 A1* | 4/2009 | Willoughby | G06Q 10/083 705/28 |
| 2009/0164390 A1* | 6/2009 | Calman | G06Q 30/0283 705/400 |
| 2009/0170482 A1* | 7/2009 | Alessio | H04M 3/42221 455/414.1 |
| 2009/0281929 A1* | 11/2009 | Boitet | G06Q 10/08 705/28 |
| 2010/0058160 A1* | 3/2010 | Navarro | G06Q 10/0637 715/208 |
| 2010/0100233 A1* | 4/2010 | Lu | G07B 17/00508 700/226 |
| 2010/0114488 A1* | 5/2010 | Khamharn | B60R 25/102 701/300 |
| 2010/0125494 A1* | 5/2010 | Boss | G06Q 30/0217 705/14.19 |
| 2010/0138321 A1* | 6/2010 | Rathbun | G07B 17/00435 705/28 |
| 2010/0169000 A1* | 7/2010 | Overgoor | G01C 21/34 701/465 |
| 2010/0185476 A1* | 7/2010 | Eager | G06Q 10/063 705/7.11 |
| 2010/0223173 A1* | 9/2010 | Kadaba | G06Q 10/0835 705/34 |
| 2010/0228574 A1* | 9/2010 | Mundinger | G01C 21/3423 705/4 |
| 2010/0274609 A1* | 10/2010 | Shoemaker | G06Q 10/08 705/333 |
| 2010/0280750 A1* | 11/2010 | Chen | G01C 21/00 701/465 |
| 2010/0332402 A1* | 12/2010 | Kantarjiev | G06Q 10/08 705/304 |
| 2011/0050424 A1* | 3/2011 | Cova | G06Q 10/0833 340/572.1 |
| 2011/0161117 A1* | 6/2011 | Busque | G06Q 20/3278 705/4 |
| 2011/0191202 A1* | 8/2011 | Keicher | G06Q 30/08 705/26.3 |
| 2011/0252112 A1* | 10/2011 | Glanton | H04L 67/306 709/217 |
| 2011/0299730 A1* | 12/2011 | Elinas | G06K 9/00791 382/103 |
| 2012/0023032 A1* | 1/2012 | Visdomini | G06Q 10/08 705/338 |
| 2012/0051587 A1* | 3/2012 | Carpenter | B07C 3/00 382/101 |
| 2012/0078743 A1* | 3/2012 | Betancourt | G06Q 10/08355 705/26.3 |
| 2012/0235791 A1* | 9/2012 | Donlan | G06Q 50/28 340/10.1 |
| 2012/0253548 A1* | 10/2012 | Davidson | G06Q 10/0631 701/1 |
| 2012/0271769 A1* | 10/2012 | Franco | G06F 21/6209 705/57 |
| 2013/0024390 A1* | 1/2013 | Zlobinsky | G06Q 10/087 705/319 |
| 2013/0033381 A1* | 2/2013 | Breed | B60T 7/16 340/568.1 |
| 2013/0094693 A1* | 4/2013 | Bolton | G06Q 10/08 382/101 |
| 2013/0103606 A1* | 4/2013 | Holliday | G06Q 10/0833 705/333 |
| 2013/0138574 A1* | 5/2013 | McCall | G06Q 10/083 705/334 |
| 2013/0144429 A1* | 6/2013 | Ragusa | B07C 3/00 700/224 |
| 2013/0198300 A1* | 8/2013 | Briggman | H04L 51/22 709/206 |
| 2013/0281115 A1* | 10/2013 | Dupray | H04W 4/025 455/456.1 |
| 2013/0297523 A1* | 11/2013 | Karr | G06Q 10/083 705/330 |
| 2013/0300830 A1* | 11/2013 | Solem | G06K 9/68 348/46 |
| 2013/0325893 A1* | 12/2013 | Asay | G06Q 10/083 707/769 |
| 2014/0099970 A1* | 4/2014 | Siomina | G01S 5/0205 455/456.1 |
| 2014/0129135 A1* | 5/2014 | Holden | G06Q 10/0833 701/420 |
| 2014/0136632 A1* | 5/2014 | Rauh | H04L 51/08 709/206 |
| 2014/0258243 A1* | 9/2014 | Bell | G06F 16/23 707/690 |
| 2014/0274031 A1* | 9/2014 | Menendez | G01S 19/48 455/426.1 |
| 2014/0378171 A1* | 12/2014 | Rudow | H04W 4/027 455/456.6 |
| 2015/0046361 A1* | 2/2015 | Williams | G06Q 10/083 705/330 |
| 2015/0248795 A1* | 9/2015 | Davidson | G01C 21/34 701/1 |
| 2015/0291193 A1* | 10/2015 | Perras | B61L 15/0018 246/122 R |
| 2015/0347959 A1* | 12/2015 | Skaaksrud | H04B 17/3913 705/333 |
| 2016/0011001 A1* | 1/2016 | Emory | G01C 21/3407 701/465 |
| 2016/0042321 A1* | 2/2016 | Held | G06Q 10/0838 705/338 |
| 2016/0196527 A1* | 7/2016 | Bose | G06Q 10/067 705/332 |
| 2016/0196750 A1* | 7/2016 | Collins | G08G 5/0086 701/14 |
| 2016/0223683 A1* | 8/2016 | Boyarski | G01S 19/47 |
| 2016/0232479 A1* | 8/2016 | Skaaksrud | G06Q 10/087 |
| 2017/0154347 A1* | 6/2017 | Bateman | G06Q 40/08 |
| 2017/0272972 A1* | 9/2017 | Egner | H04W 28/0268 |
| 2017/0309083 A1* | 10/2017 | Novak | G07B 15/063 |
| 2018/0060808 A1* | 3/2018 | Borgerson | G06Q 10/0831 |
| 2018/0087903 A1* | 3/2018 | Werner | G01C 21/165 |
| 2018/0087904 A1* | 3/2018 | Morrison | G01C 22/006 |
| 2018/0087907 A1* | 3/2018 | DeBitetto | G01C 21/30 |
| 2018/0098198 A1* | 4/2018 | Mappus | G01S 5/0294 |
| 2018/0188380 A1* | 7/2018 | Venkatraman | G01S 19/396 |
| 2018/0195864 A1* | 7/2018 | Sengupta | G08G 1/0112 |

(56) References Cited

U.S. PATENT DOCUMENTS

| | | | |
|---|---|---|---|
| 2018/0211204 A1* | 7/2018 | Bruns | G06Q 10/087 |
| 2018/0330225 A1* | 11/2018 | Zhuo | H04W 4/027 |
| 2019/0063946 A1* | 2/2019 | Aoyama | G01C 21/3694 |
| 2019/0094389 A1* | 3/2019 | Li | G01S 19/49 |
| 2019/0132703 A1* | 5/2019 | Ramasamy | H04W 4/029 |
| 2019/0226862 A1* | 7/2019 | Shaukat | B60W 40/08 |
| 2019/0230474 A1* | 7/2019 | Lanes | H04W 4/029 |
| 2019/0295035 A2* | 9/2019 | Radetzki | G06Q 10/08355 |
| 2019/0311327 A1* | 10/2019 | Habbaba | H04W 4/44 |
| 2019/0318298 A1* | 10/2019 | Driegert | G06Q 10/083 |
| 2019/0333373 A1 | 10/2019 | Fang et al. | |
| 2019/0385119 A1* | 12/2019 | Chang | G06Q 10/0833 |
| 2020/0065760 A1* | 2/2020 | Ayoub | G06F 16/90335 |
| 2020/0088526 A1* | 3/2020 | Dousse | G01C 21/30 |
| 2020/0097902 A1* | 3/2020 | Anders | G06Q 10/0833 |
| 2020/0107264 A1* | 4/2020 | Ayoub | H04W 52/0212 |
| 2020/0116492 A1* | 4/2020 | Scott | G06F 16/29 |
| 2020/0120447 A1* | 4/2020 | Ryden | H04W 64/006 |
| 2020/0120479 A1* | 4/2020 | Ryden | H04W 64/00 |
| 2020/0134556 A1* | 4/2020 | Lahav | G06Q 10/0833 |
| 2020/0183414 A1* | 6/2020 | Shih | B60R 25/01 |
| 2020/0208992 A1* | 7/2020 | Fowe | G01C 21/30 |
| 2020/0217669 A1* | 7/2020 | Hu | G01C 21/3841 |
| 2020/0218253 A1* | 7/2020 | Ramamurthy | B60W 60/001 |
| 2020/0242555 A1* | 7/2020 | Liu | G06F 16/29 |
| 2020/0305003 A1* | 9/2020 | Landa | H04W 4/02 |
| 2020/0334631 A1* | 10/2020 | Conlon | G06Q 10/0833 |
| 2020/0386565 A1* | 12/2020 | Rao | G01C 21/10 |
| 2021/0004363 A1* | 1/2021 | Bailly | G06F 16/235 |
| 2021/0006650 A1* | 1/2021 | Yankov | G06Q 10/0833 |
| 2021/0039695 A1* | 2/2021 | Hosseinipour | B61L 27/0038 |
| 2021/0048540 A1* | 2/2021 | Miller | G01S 13/931 |
| 2021/0082283 A1* | 3/2021 | Malla | G06K 9/3233 |
| 2021/0082297 A1* | 3/2021 | Jacobus | G05D 1/0257 |
| 2021/0092024 A1* | 3/2021 | Delaney | H04L 29/08819 |
| 2021/0157325 A1* | 5/2021 | Beller | G05D 1/0214 |
| 2021/0185616 A1* | 6/2021 | Tham | G01S 19/34 |
| 2021/0232610 A1* | 7/2021 | Su | H04W 64/006 |

OTHER PUBLICATIONS

Santanu Guha, "AutoWitness: Locating and Tracking Stolen Property While Tolerating GPS and Radio Outages", ACM Transactions on sensor Networks, vol. 8, No. 4, Article 31, on Sep. 2012, all pages (Year: 2012).*

Sushil Kumar, "Geometry-Based Localization for GPS Outage in Vehicular Cyber Physical Systems", IEEE Transactions on Vehicular Technology, vol. 67, No. 5, May 2018, all pages (Year: 2018).*

Lorinda Semeniuk, "Bridging GPS outages using neural network estimates of INS position and velocity errors", IOP Publishing, 2006, all pages (Year: 2006).*

Aashish Sheshadri, "Position Estimation by Registration to Planetary Terrain", 2012 IEEE International Conference on Multisensor Fusion and Integration for Intelligent Systems (MFI), 2012, all pages (Year: 2012).*

Stephen Smith, "Navigation in GPS-Denied Environments", IEEE, 2011, all pages (Year: 2011).*

Wen Ye, "Deep Gaussian Process Regression for Performance Improvement of POS During GPS Outages", IEEE Access, Jun. 24, 2020, all pages (Year: 2020).*

Yuexin Zhang, "A Low-Cost GPS/INS Integration Methodology Based on DGPM During GPS Outages", IEEE, 2018, all pages. (Year: 2018).*

Yichen Sun, "Decision Making Process and Factors Affecting Truck Routing", B.Eng., Hong Kong University of Science and Technology (2011), Submitted to the Department of Civil and Environmental Engineering in partial fulfillment of the requirements of the degree of Master of Science in Transportation at the Massachusetts Institute of Technology Jun. 2013.

* cited by examiner

SUPPLY CHAIN VISIBILITY PLATFORM

PRIORITY

This application is a continuation of U.S. patent application Ser. No. 16/925,306, filed on Jul. 9, 2020, the contents of which are hereby expressly incorporated by reference in their entirety and for all purposes.

TECHNICAL FIELD

The present disclosure generally relates to freight tracking and predictive visibility data.

BACKGROUND

Supply chain visibility information, such as freight/load tracking data, generally relies on real-time data provided by sensors and Internet-of-Things (IoT) devices such as GPS trackers as well as location updates received from various sources such as shippers or carriers. However, such data is often unavailable, which can cause gaps or inaccuracies in the supply chain visibility information. For example, such data can become unavailable, outdated/stale, or erroneous due to various factors such as system integration or failure events, operational issues, unfavorable weather conditions, incorrect/noisy data points, network connectivity issues, etc. Unfortunately, these factors are generally not under the control of the provider of such visibility information and can affect the consistency of the loads that are being tracked and the accuracy or value of tracking information.

BRIEF DESCRIPTION OF THE DRAWINGS

In order to describe the manner in which the various advantages and features of the disclosure can be obtained, a more particular description of the principles described herein will be rendered by reference to specific embodiments thereof which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Figure 1:
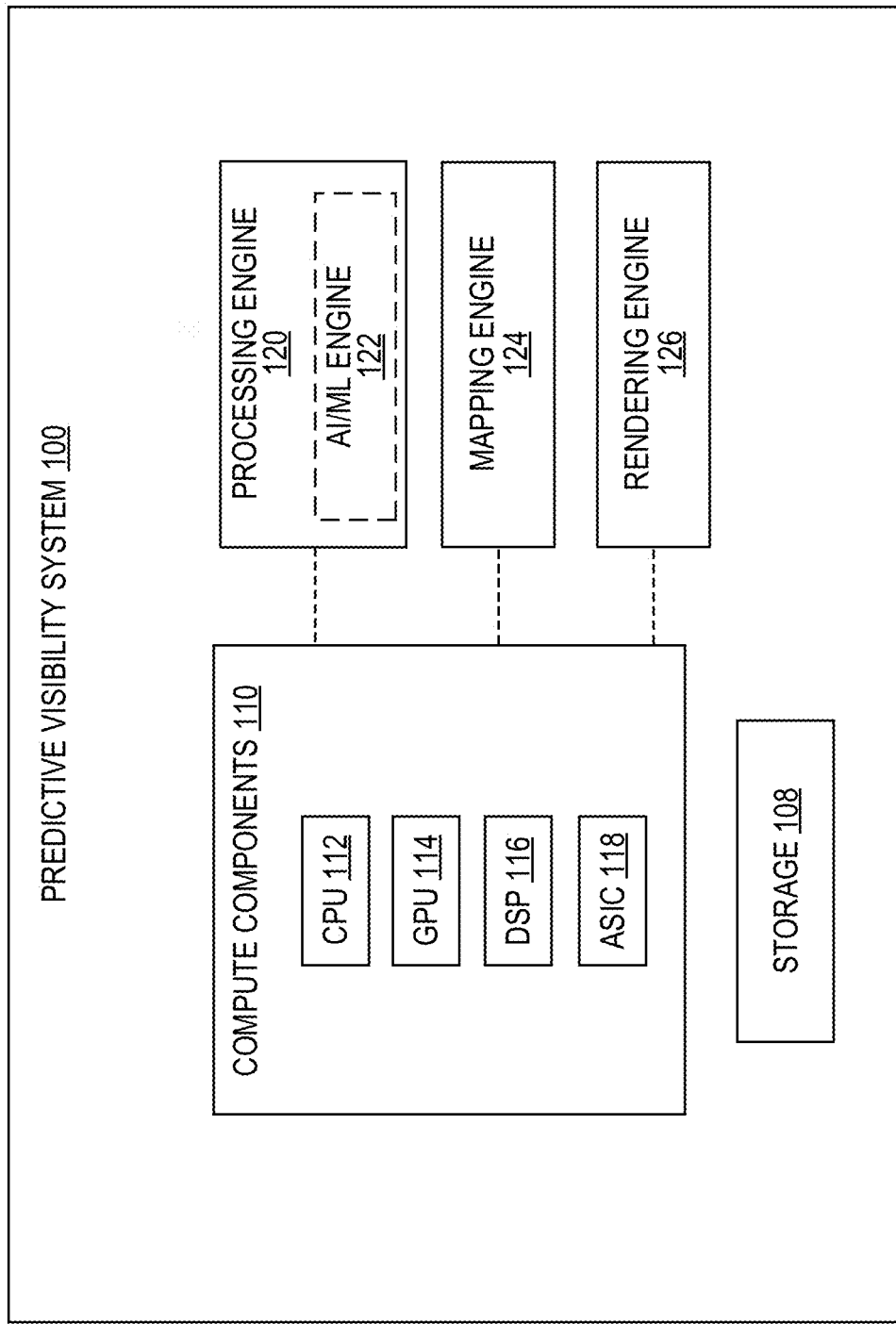
FIG. 1 is a block diagram illustrating an example predictive visibility system for calculating and providing supply chain visibility for freights or loads, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously explained, supply chain visibility information, such as freight/load tracking data, generally relies on real-time data provided by sensors and IoT devices as well as location updates received from various sources such as shippers or carriers. However, such data is often unavailable, which can cause gaps or inaccuracies in the supply chain visibility information. Such data can become unavailable, outdated/stale, or erroneous due to various factors such as system integration or failure events, operational issues, unfavorable weather conditions, incorrect/noisy data points, network connectivity issues, etc. Unfortunately, these factors are generally not under the control of the provider of such visibility information and can affect the consistency of the loads being tracked and the accuracy or value of the tracking information. Accordingly, there is a need in the art for an intelligent system that provides predictive, real-time visibility that improves the quality of freight, load, and/or supply chain tracking data and identifies milestone and other events throughout the journey.

Disclosed herein are systems, methods, and computer-readable storage media for predicting the visibility of freights or loads throughout the lane or journey in a constrained environment where tracking updates and/or location data is unavailable, outdated, and/or incorrect at one or more periods of the journey. In some examples, the approaches herein can provide a supply chain visibility platform that provides predictive visibility for freights or loads in a constrained environment where real-time data about a carrier and load is unavailable, such as GPS data, electronic logging device data, and/or location updates. The supply chain visibility platform can thus provide predicted visibility information in scenarios where real or actual visibility information (e.g., location updates and device/sensor data) is not available or only partial visibility information is available.

The supply chain visibility platform can include an AI (artificial intelligence) system that predicts the route a freight or load is going to travel from pickup to delivery and/or throughout a trip from pickup to delivery. The AI system can predict the route based on information about the load (e.g., load attributes such as the type of load, the weight of the load, load restrictions/constraints, transportation vehicle for the load (e.g., truck, trailer, etc.), appointment time, shipment priority, etc.), information about the carrier (e.g., who is transporting the load, what type of vehicle uses the carrier, etc.), the industry associated with the load (e.g., food, chemical, pharmaceutical, electronics, clothing, etc.), the shipper of the load, the day/time in which the load is being transported, information about the source/origin location and/or the destination (e.g., city, state, country, facility, business hours, distance from source/origin to destination, etc.), historical information (e.g., shipping or carrier patterns or histories, load patterns or histories, industry patterns or histories, source and/or destination patterns or histories, historic usage of different lanes, driver's resting and/or driving patterns, etc.), the day/time the load was picked up by the carrier, news information, weather information, traffic information, and/or any other relevant information.

In addition to route prediction information, the predictive visibility provided by the supply chain visibility platform can also include driving patterns or behaviors predicted for the load and/or trip. Driving patterns can include, for example and without limitation, possible rest positions during the trip/journey, a speed at which the load/carrier is going to travel, the location of the load/carrier at a future time, etc. In some cases, the predictive visibility can also include other predicted information such as, for example, information about potential conditions encountered by the load/carrier during the trip (e.g., traffic conditions, road conditions, path conditions, potential delays, rerouting conditions, weather conditions, hazards, carrier or vehicle conditions, load conditions, etc.), potential status information at a future time, etc.

The supply chain visibility platform can include a presentation and/or notification element for presenting or providing predicted visibility information. For example, the supply chain visibility platform can include an interface, a website or webpage, an application, a messaging system, an application programming interface (API), a presentation service, etc., which can present, render, and/or otherwise provide or transmit predicted visibility information to requesting devices. In some cases, the supply chain visibility platform can present or render predicted visibility information in one or more formats and/or content items such as, for example, in a table, a chart, a map, a video, a text message, a web page, a file, a list, an email, a graphical rendering, etc. In some cases, the supply chain visibility platform can present/display and/or project actual visibility information obtained in addition to the predicted visibility information. For example, the supply chain visibility platform can present/display and/or project a difference between predicted visibility information calculated and actual visibility information obtained.

FIG. 1 illustrates an example predictive visibility system 100 for calculating and providing supply chain visibility for freights/loads. As further described herein, the predictive visibility system 100 can implement or represent a supply chain visibility platform and can provide various advantages such as tracking, predicting and providing real-time visibility information even in the absence of (or with limited) location updates/data from location providers or devices; providing estimated time of arrivals of shipments in the absence of (or with limited) location updates/data; improving a consistency and reliability of tracking information; providing estimated hours of service in the absence of location (or with limited) updates, providing estimated rest points in the absence of (or with limited) location updates/data, predicting points of interest in the absence of (or with limited) location updates/data, etc.

In the example shown in FIG. 1, the predictive visibility system 100 includes a storage 108, compute components 110, a processing engine 120, an AI/ML engine 122, a mapping engine 124, and a presentation engine 126. However, it should be noted that the example components shown in FIG. 1 are provided for illustration purposes and, in other examples, the predictive visibility system 100 can include more or less components (and/or different components) than those shown in FIG. 1.

The predictive visibility system 100 can be part of a computing device or multiple computing devices. In some examples, the predictive visibility system 100 can be part of an electronic device (or devices) such as a server, a content delivery system, a host machine in a network such as a cloud network, a computer in a vehicle, a computer, or any other suitable electronic device(s). In some examples, the predictive visibility system 100 can be or include a software service and/or virtual instance hosted on a datacenter or network environment. For example, the predictive visibility system 100 be implemented by, or as part of, one or more software containers hosted on a datacenter or cloud, virtual machines hosted on a datacenter or cloud, functions (e.g., function-as-a-service, virtualized function, etc.) hosted on one or more execution environments or hosts on a datacenter or cloud, etc.

In some cases, the predictive visibility system 100 can be implemented in a distributed fashion across one or more networks or devices. For example, the predicted visibility system 100 can be a distributed system implemented by, or hosted on, one or more hosts and/or infrastructure components/devices on one or more clouds, datacenters, networks, and/or compute environments.

In some implementations, the storage 108, the compute components 110, the processing engine 120, the AI/ML engine 122, the mapping engine 124, and/or the presentation engine 126 can be part of the same computing device. For example, in some cases, the storage 108, the compute components 110, the processing engine 120, the AI/ML engine 122, the mapping engine 124, and/or the presentation engine 126 can be implemented by a server computer. However, in some implementations, the storage 108, the compute components 110, the processing engine 120, the AI/ML engine 122, the mapping engine 124, and/or the presentation engine 126 can be part of two or more separate computing devices.

The storage 108 can be any storage device(s) for storing data, such as predicted visibility information (e.g., route or state estimates, driving/transportation behavior, temporal-spatial information, etc.), actual visibility information (e.g., status updates, sensor data, actual pings, etc.), historical information, reports, mapping data, information collected from one or more sources, statistics, files, data objects, profiles, carrier information, shipper information, industry information, load or freight information, requirements or constraints, preferences, etc. Moreover, the storage 108 can store data from any of the components of the predictive visibility system 100. For example, the storage 108 can store data or calculations (e.g., processing parameters, predictive outputs, processing results, generated content, algorithms, etc.) from the compute components 110, the processing engine 120, and/or the AI/ML engine 122, data or content from the mapping engine 124 (e.g., maps, routes, previews, etc.), and/or data or content from the presentation engine 126 (e.g., outputs, renderings, interface content, web page content, message content, etc.).

In some implementations, the compute components 110 can include a central processing unit (CPU) 112, a graphics processing unit (GPU) 114, a digital signal processor (DSP) 116, an application-specific integrated controller (ASIC) 118, and/or one or more other processing devices or controllers. It should be noted that the compute components 110 shown in FIG. 1 are provided for illustration purposes and, in other examples, the predictive visibility system 100 can include more or less (and/or different) compute components than those shown in FIG. 1.

The compute components 110 can perform various operations such machine learning and/or AI operations, predictive estimates or calculations, graphics rendering, content delivery, data processing, object or feature recognition, data mining, tracking, filtering, mapping operations, messaging operations, content generation, and/or any of the various operations described herein. In some examples, the compute components 110 can implement the processing engine 120, the AI/ML engine 122, the mapping engine 124, and/or the presentation engine 126. In other examples, the compute components 110 can also implement one or more other processing engines and/or software services.

Moreover, the operations performed by the processing engine 120, the AI/ML engine 122, the mapping engine 124, and/or the presentation engine 126 can be implemented by one or more of the compute components 110. In one illustrative example, the processing engine 120, the one or more AI/ML engine 122, and/or the mapping engine 124 (and associated operations) can be implemented by the CPU 112, the DSP 116, and/or the ASIC 118, and the presentation engine 126 (and associated operations) can be implemented by the CPU 112 and/or the GPU 114. In some cases, the compute components 110 can include other electronic circuits or hardware, computer software, firmware, or any combination thereof, to perform any of the various operations described herein.

In some cases, the compute components 110 can generate and/or provide a user interface (UI) or content item for presenting/displaying/rendering predicted visibility information calculated for freights/loads, as well as actual visibility information. The predicted visibility information can include, for example, estimated or predicted routes, driving patterns or behaviors (e.g., rest positions, speed of travel, stops, deviations, time of arrival, acceleration information, state information, status information, etc.), predicted locations (e.g., predicted location at one or more times), tracking visualizations, notifications, etc. In some examples, the UI can also present actual visibility information obtained at one or more periods during the journey. In some examples, the compute components 110 can provide such information via the presentation engine 126.

In some examples, the compute components 110 can provide predictive visibility for freights in a constrained environment where there is no real-time data about the carrier, such as GPS (global position system) or ELD (electronic logging device) data or location updates. In some examples, the processing engine 120 implemented by the compute components 110 can predict, in prior, the route a freight or load is going to travel from a pickup location to a delivery destination and/or the location of the freight or load at one or more times, based information obtained or collected by the processing engine 120, such as any load information including one or more attributes of the load and/or trip. The attributes of the load and/or trip may include, for example, the carrier transporting the load, the industry to which the item being carried can be categorized to, the shipper of the load, the day/time at which the load is being carried, delivery preferences and/or constraints, load characteristics and/or requirements, the distance between the pickup location and the delivery destination, the geographic region(s) associated with the trip, seasonality characteristics (e.g., a season associated with the trip), etc.

For example, the processing engine 120 can information about the vehicle (e.g., truck, airplane, ship, etc.) used by the carrier, which can suggest potential traveling speeds of the carrier or certain paths/regions the carrier may not be able/allowed to travel (e.g., a large truck may be prohibited from travel on certain roads or areas); previous transportation patterns of that carrier; the industry associated with the load, which may indicate certain paths or regions that the carrier may not be able or allowed to travel (e.g., because of regulations associated with the industry or requirements associated with products in that industry); information about a load, such as the weight of the load or constraints for transporting the load (e.g., climate or timing constraints for perishable goods, regulations for chemicals, etc.); statistics for similar loads (e.g., what routes those loads traveled, what patterns exist in previous trips with similar loads, etc.); a season associated with the trip, and so forth. The processing engine 120 can use this information to predict the route the load will travel even without real-time data about the carrier or load.

For example, the processing engine 120 can predict that the load may or may not travel a certain path because of regulations or constraints affecting what path(s) or route(s) the carrier and/or load can travel and/or what path(s) or route(s) the carrier and load are likely to travel. The processing engine 120 can then predict a route for the load even without real-time data about the carrier and load. To illustrate, the processing engine 120 can determine that the carrier's vehicle is not allowed to travel in a number of possible roads or areas but is allowed to travel in a number of other possible other roads or areas. The processing engine 120 can also determine that the type of load carried cannot travel in some of the possible roads or areas that the vehicle of the carrier is allowed to travel. The processing engine 120 can also determine that the type of load has certain timing or climate requirements that would likely cause the carrier to travel the fastest route, the cheapest route, or a route having a certain climate, landscape or weather.

Moreover, the processing engine 120 may analyze a history of previous loads from the particular shipper to identify additional information, such as information about the carrier often used by that shipper and/or for that type of load (e.g., certain carriers having a temperature-controlled vehicle if the load has temperature requirements, certain carriers having a vehicle that can transport a certain type of chemical included in the load, certain carriers that can transport loads as large as the load being transported, etc.). The processing engine 120 may also review a history of previews trips by that carrier and/or for similar loads and identify certain route patterns. Based on some or all of this information above (and/or any other relevant information), the processing engine 120 may identify a most-probable route that the carrier with the load will travel and/or a ranked list of possible routes that the carrier of the load will travel. The processing engine 120 can then generate a prediction output identifying the predicted route for the load.

In some aspects, the processing engine 120 can generate predicted visibility information that not only includes the route a load is traveling (or is predicted to travel) but also predicted driving pattern(s) or behavior(s) such as possible rest positions, the speed at which the load is going to travel, the location at which the load will be at a specific time, a predicted time of arrival, etc. For example, the processing engine 120 may analyze timing requirements of the load, such as a required trip duration for the load; temperature requirements for the load; paths or areas in which the carrier's vehicle and/or the load is/are not allowed to travel; transportation requirements for the load; previous patterns of the carrier; previous patterns associated with similar loads; etc. The processing engine 120 can use such information to predict that the carrier will increase its speed of travel or take a different trajectory (e.g., to meet certain timing requirements), the carrier will stop at a specific rest point to avoid traveling through a certain path at certain hours prohibited for that type of load, stop at a nearby refueling station to accommodate for higher fuel consumption requirements associated with the vehicle used by that carrier, etc.

Moreover, the processing engine 120 can generate such information and operate on scenarios where there is no real/actual or accurate visibility information or there is only partial real/actual or accurate visibility information. For example, the processing engine 120 can generate such information and operate in scenarios where there are only limited real-time data updates (e.g., only at limited times and/or locations during the trip) about the carrier or load available. Real/actual visibility information can be obtained from one or more sources such as, for example, one or more GPS devices, ELD devices, a shipper/carrier/third party (e.g., location updates from the shipper, carrier, or a third party), the Internet, electronic devices (e.g., smartphones, tracking devices, laptops, tablet computers, servers, etc.), device pings, data web scrapping, API endpoints, news reports, users, computers on vehicles, smart devices, and/or any other sources.

In some cases, real/actual visibility information can be used, when available, to supplement any predicted visibility information calculated for a load and/or freight. Moreover, in some cases, real/actual visibility information can be used, when available, to generate outputs differentiating predicted and real/actual visibility information. For example, in some aspects, the processing engine 120 can generate and the presentation engine 126 can surface (e.g., via a UI) and project a difference between predicted visibility information and real/actual visibility pings. Moreover, the processing engine 120 can generate predicted visibility information relating to various use cases such as, for example, rest positions, tempo-spatial information (e.g., check calls), acceleration, detours, re-routes, route conditions, etc.

In some examples, the processing engine 120 can implement the AI/ML engine 122 to predict, in prior, the route a freight or load is going to travel from a pickup location to a delivery destination and/or generate the predicted visibility information. In some cases, the AI/ML engine 122 can implement one or more neural networks, such as a recurrent neural network, to predict the route of the freight or load and/or generate the predicted visibility information. In other cases, the AI/ML engine 122 can implement other techniques to predict the route of the freight or load and/or generate the predicted visibility information. For example, the AI/ML engine 122 can use sequence modelling, learning, prediction (e.g., using AI), and/or other techniques to predict the route of the freight or load and/or generate the predicted visibility information. In some cases, the AI/ML engine 122 can use Markov chains, tensor factorization, dynamic Bayesian networks, conditional random fields, etc., to predict the route of the freight or load and/or generate the predicted visibility information.

The mapping engine 124 can generate maps and/or mapping information to calculate and/or present visibility information (predicted and/or real/actual). For example, the mapping engine 124 can store maps and generate route previews and/or visibility information in specific maps associated with a trip. The mapping engine 124 can generate route previews and/or visibility information in maps based on data and calculations generated by the processing engine 120. In some cases, the mapping engine 124 can maintain and/or manage mapping data such as possible routes, directions, landmarks, locations, geographic information, addresses, distance information, three-dimensional renderings, route previews, landscapes, road/street names, etc.

While the predictive visibility system 100 is shown to include certain components, one of ordinary skill will appreciate that the predictive visibility system 100 can include more or fewer components than those shown in FIG. 1. For example, the predictive visibility system 100 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing device and hardware components that can be implemented with the predictive visibility system 100 is described below with respect to FIG. 7.

Figure 2:
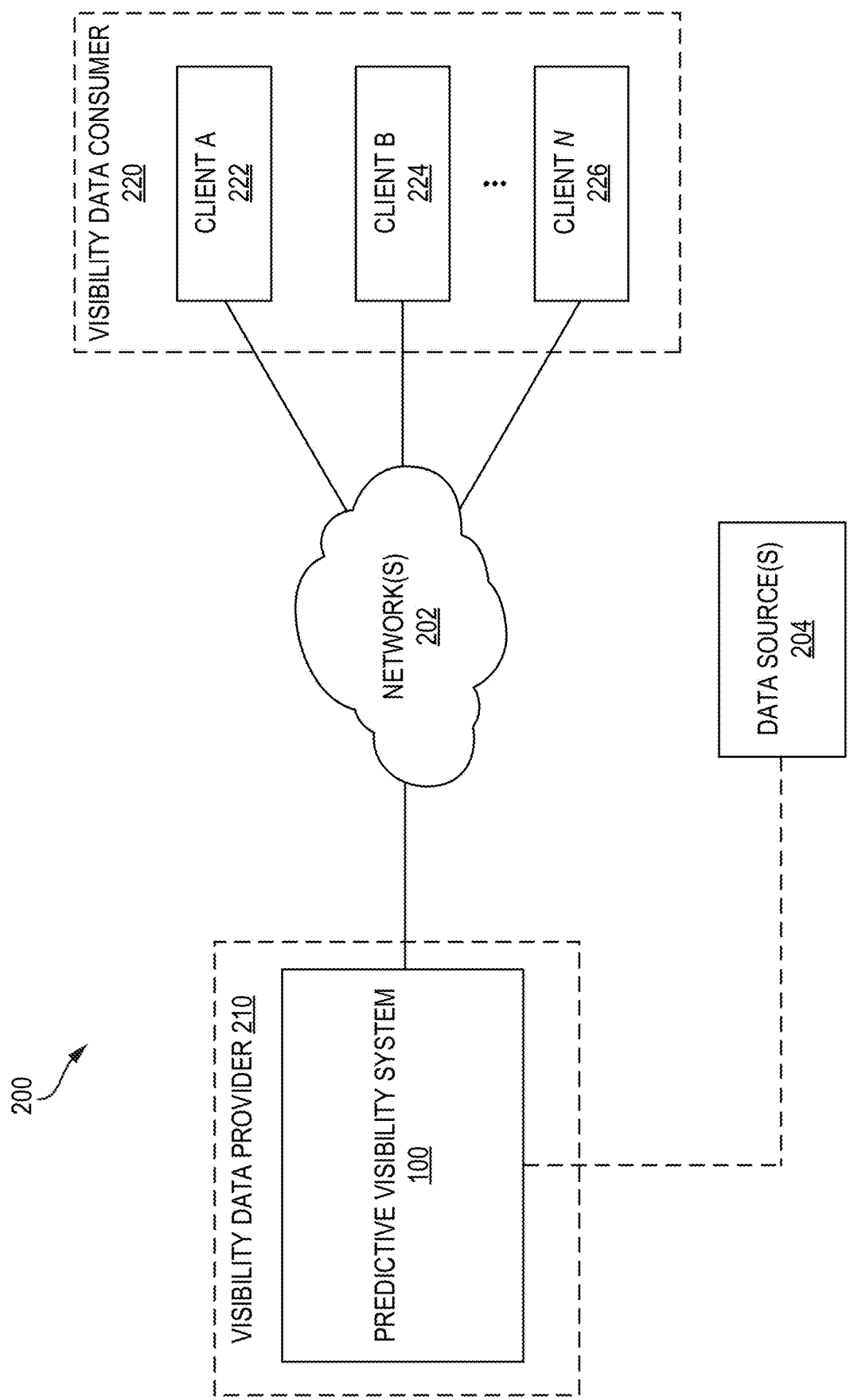
FIG. 2 is a block diagram illustrating an example environment for implementing a predictive supply chain platform including a predictive visibility system, in accordance with some examples of the present disclosure.

FIG. 2 illustrates an example environment 200 for implementing a predictive supply chain platform including a predictive visibility system 100. In this example, the environment 200 includes the predictive visibility system 100 for calculating and providing predicted visibility information to client devices 222-226. The predictive visibility system 100 can be hosted, implemented, and/or owned by a visibility data provider 210. The visibility data provider 210 can include, for example, one or more entities that provide supply chain management and/or visibility services such as those described herein.

Moreover, the predictive visibility system 100 can communicate with the client devices 222-226 over a network 202. The network 202 can include one or more private and/or public networks, such as one or more local area networks (LANs), wide area networks (WANs), cloud networks (private and/or public), on-premises datacenters, virtual private networks (VPNs), and/or any other type(s) of network(s).

The client devices 222-226 can include any electronic devices used by visibility data consumers 220, such as users and/or customers of the visibility data provider 210, to communicate with the predictive visibility system 100 and obtain associated data and services, as further described herein. For example, the client devices 222-226 can include a laptop computer, a tablet computer, a smartphone, a desktop computer, a server, an internet-of-thing (IoT) device, a smart or autonomous vehicle (e.g., a computer on an autonomous vehicle), a mobile device, etc. In some examples, the client devices 222-226 can access information and services provided by the predictive visibility system 100, such as predictive and/or real/actual visibility information, via the network 202. In some cases, the client devices 222-226 and/or the visibility data consumers 220 can also provide information to the predictive visibility system 100. For example, the client devices 222-226 can provide location and/or status updates to the predictive visibility system 100 when such location and/or status updates are available and/or when the client devices 222-226 have sufficient connectivity (e.g., via the network 202 and/or any other means) to provide such information to the predictive visibility system 100. The predictive visibility system 100 can use such information to provide real/actual visibility information, calculate predicted visibility information, etc.

In some cases, the predictive visibility system 100 can obtain information from one or more data sources 204, which the predictive visibility system 100 can use to provide supply chain visibility information, such as predictive and/or real/actual visibility information. Such information can include, for example and without limitation, information about a load (e.g., load attributes such as the type of load, the weight of the load, load restrictions/constraints; delivery parameters; carrier; shipper; industry; shipment priority; appointment time; etc.), information about a carrier (e.g., carrier identity, carrier history, carrier statistics, carrier preferences, carrier profile, type of transportation vehicle, etc.), information about an industry (e.g., industry profile, industry preferences, industry statistics, industry requirements, industry constraints, etc.), information about a shipper (e.g., shipper identity, shipper history, shipper statistics, shipper preferences, shipper profile, etc.), historical information (e.g., shipping or carrier patterns or histories, load patterns or histories, industry patterns or histories, source and/or destination patterns or histories, router patterns or histories, etc.), mapping data, traffic data, weather data, news information, agency reports, order information, regulations, location information, tracking parameters, notifications, cost information, supply chain information, potential delays or hazards, trip information, sensor data (e.g., GPS data, ELD data, image sensor data, acceleration measurements, velocity, radar data, etc.), distance between an origin and destination location, and/or any other relevant information.

In some examples, the predictive visibility system 100 can receive at least some of such information from the one or more sources 204 via the network 202 and/or a separate communication path such as a separate network, a direct connection (wired or wireless) connection, an out-of-band link/connection, and/or any other mechanism or path. In some examples, the predictive visibility system 100 can receive some of such information from the client devices 222-226 and/or the visibility data consumers 220. The one or more sources 204 can include, for example, the Internet, a news source, a government agency, a sensor or electronic device (e.g., a GPS device, an ELD device, etc.), a database, a data portal, a data repository, an email system, an API endpoint, etc.

While the example environment 200 is shown to include certain devices and entities, one of ordinary skill will appreciate that the example environment 200 is only one illustrative example and can include more or fewer devices and/or entities than those shown in FIG. 2.

Figure 3:
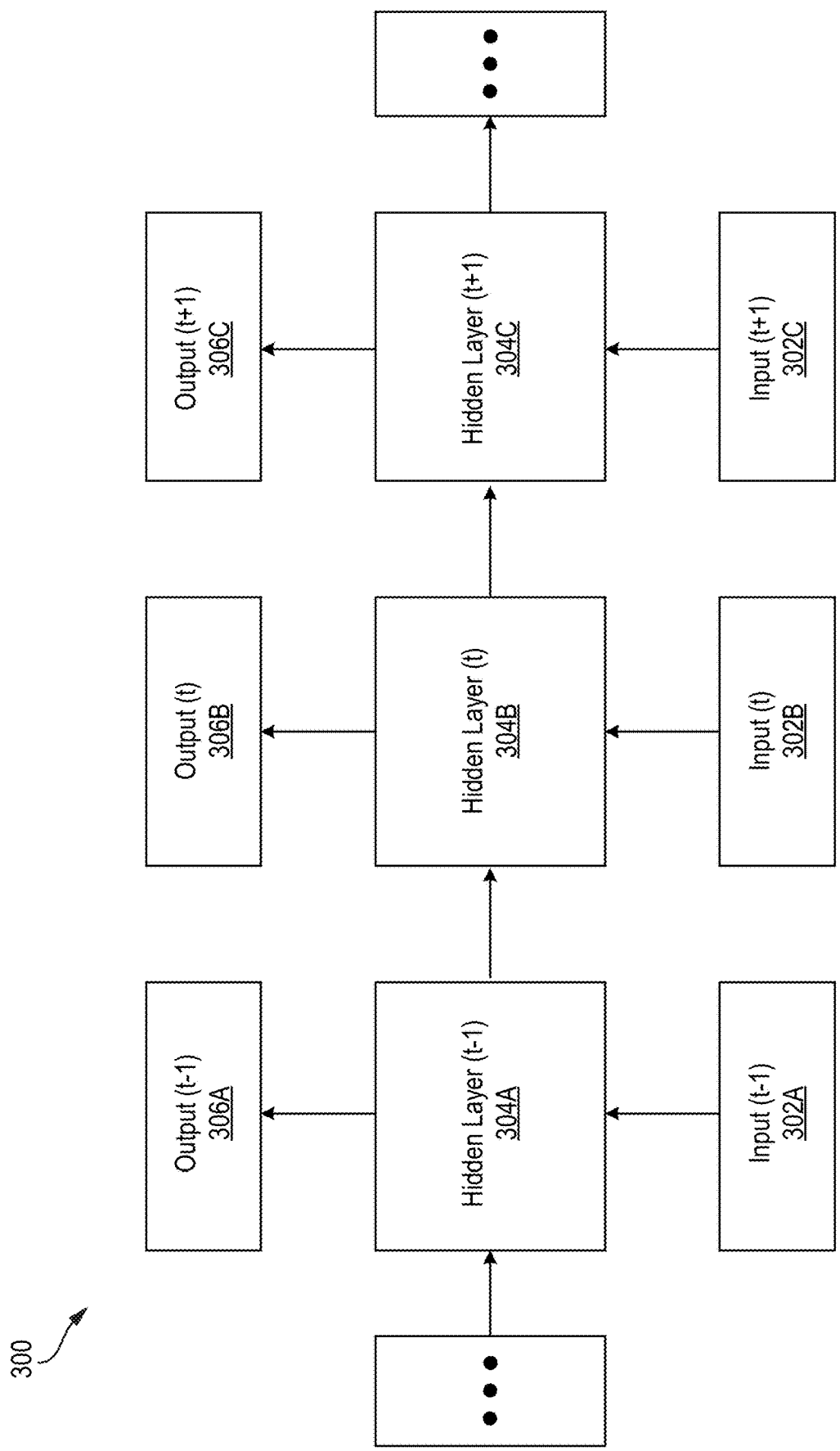
FIG. 3 illustrates an example use of a neural network for generating predicted visibility information for a load or freight, in accordance with some examples of the present disclosure.

FIG. 3 illustrates an example configuration 300 of a recurrent neural network (RNN) that can be implemented by the AI/ML engine 122 and/or the processing engine 120. In some cases, the RNN can be implemented to calculate supply chain visibility information such as predicted visibility information. For example, the RNN can be implemented to predict routes, predict carrier or transportation patterns or behaviors (e.g., rest positions, acceleration, detours, stops, velocity, future locations, etc.), predict time of arrivals, predict supply chain or trip conditions, predict alternate routes, etc. In some examples, the RNN can perform such predictions in the absence of (or with limited or partial) actual/real updates and/or location or status information. For example, the RNN can make such predictions during and/or after system failures, operational issues, unfavorable weather conditions, incorrect or noisy data points, network or communication failures, etc.

The RNN can be well-suited to deal with sequential data such as, for example, supply chain visibility information (e.g., predictive and/or real/actual visibility information) as described herein and/or any other spatially and/or temporally organized data. The RNN can process such data to generate predicted visibility information, as further described herein. In the example configuration 300, the RNN can process input data 302A, 302B, and 302C (collectively "302") via one or more hidden layers 304A, 304B, 304C, to generate outputs 306A, 306B, and 306C. The input data 302 can include, for example, load information (e.g., load attributes), carrier information, shipper information, delivery constraints, trip details, time information, statistics, a pickup location, a delivery destination, a pickup time, map information, load industry information, customer preferences, shipper preferences, weather information, seasonal information, etc. In some examples, the input data 302A, 302B, and 302C be temporally and/or spatially ordered.

The hidden layers 304A, 304B, 304C can apply specific activation functions to the input data 302A, 302B, 302C to generate the outputs 306A, 306B, 306C. The hidden layers 304A, 304B, 304C can have specific weights and biases which can include a set of parameters derived from a training of the RNN. The weights or biases can include a numeric value (e.g., a numeric weight or bias) that can be tuned, allowing the RNN to be adaptive to inputs and able to learn as more data is processed.

At time step t−1, input 302A can be fed into hidden layer 304A, which can generate an output 306A based on the input 302A. The hidden layer 304A can calculate its current state at time step t−1 based on the input 302A. At time step t, the hidden layer 304B can calculate its current state (e.g., output 306B) based on the input 302B at time step t and the previous state at time step t−1 (e.g., output 306A). At time step t+1, the hidden layer 304C can calculate its current state (e.g., output 306C) based on the input data 302C at time step t+1 and the previous state at time step t (e.g., output 306B). Once all the time steps are completed, the RNN uses the final current state to calculate the final output. In this way, the RNN can process sequential data, memorizing each previous output and using the previous state when calculating a next current state.

Thus, the RNN structure can allow a current function and/or state to account for past data. In one illustrative example, the RNN can generate a final output that provides, based on the input data 302, one or more predicted routes, predicted transportation or driving patterns, predicted carrier behaviors, predicted supply chain events or conditions, and/or any other predicted visibility information as described herein.

While the example above describes a use of an RNN to generate predicted visibility information, it should be noted that this is just an illustrative example provided for explanation purposes and, in other examples, the RNN can also be used for other tasks. It should also be noted that, in other examples, the approaches can implement other techniques (either in addition to, or in lieu of, implementing an RNN) and/or network/modeling architectures to generate predicted visibility information. For example, as further described herein, in some examples, the disclosed approaches can use sequence modelling, learning, prediction (e.g., using AI), and/or other techniques to generate the predicted visibility information. In some cases, disclosed approaches can use Markov chains, tensor factorization, dynamic Bayesian networks, conditional random fields, and/or any other modelling, learning, and/or prediction techniques, to generate the predicted visibility information. Moreover, in some cases, other types of neural networks can be implemented in addition to, or in lieu of, the RNN in FIG. 3 such as, for example and without limitation, an autoencoder, deep belief nets (DBNs), a convolutional neural network (CNN), etc.

Figure 4:
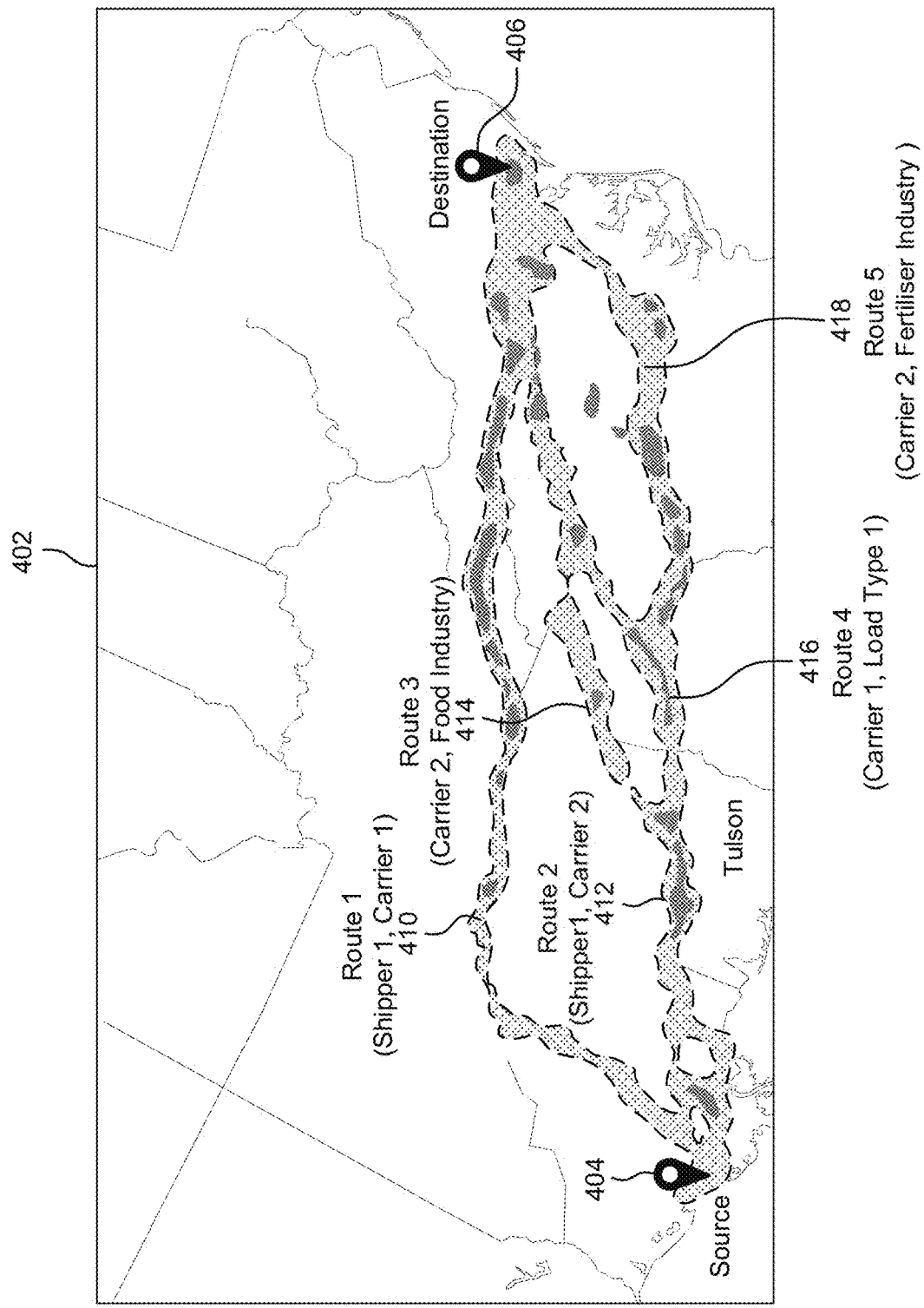
FIG. 4 illustrates an example map depicting example routes estimated for loads by a predictive visibility system, in accordance with some examples of the present disclosure.

FIG. 4 illustrates an example map 402 depicting example routes 410-418 estimated for loads by the predictive visibility system 100. The predictive visibility system 100 can predict the routes 410-418 for the loads from a source location 404 (e.g., pickup location) of the loads to a delivery destination 406 for the loads. In some examples, the predictive visibility system 100 can use the AI/ML engine 122 to predict the routes 410-418.

In some examples, the predictive visibility system 100 can predict (e.g., via the AI/ML engine 122) the routes 410-418 based on load attributes. The load attributes associated with a load can include, for example, a type of load, load characteristics (e.g., weight, size, delivery requirements, handling requirements, etc.), information about the carrier transporting the load (e.g., carrier profile, carrier statistics, carrier reports, carrier history, carrier characteristics, carrier patterns, etc.), information about the shipper of the load (e.g., shipper profile, shipper statistics, shipper reports, shipper history, shipper characteristics, shipper preferences, etc.), information about the industry associated with the load (e.g., the type of industry, industry requirements, industry regulations, industry patterns, industry characteristics, industry profile, industry reports, industry statistics, etc.), an indication of the pickup location 404, an indication of the pickup date/time, an indication of the delivery destination 406, trip preferences, etc.

Moreover, the predictive visibility system 100 can predict the routes 410-418 without actual or observed location or status information for the loads or with only partial location or status information for the loads. For example, the predictive visibility system 100 can predict the routes 410-418 and future times of the loads without (or with limited) location information or updates for the loads, and can predict route segments before the load have reached any portion of such route segments.

As shown in FIG. 4, the estimated routes 410-418 for the loads can vary based on different load attributes. For example, the predictive visibility system 100 can predict route 410 for Shipper 1 and Carrier 1, route 412 for Shipper 1 and Carrier 2, route 414 for Carrier 2 and the food industry, route 416 for Carrier 1 and load type 1, and route 418 for Carrier 2 and the fertilizer industry. Here, the routes 410-418 vary based on differences between the carriers, shippers, industries, and load types associated with the loads corresponding to the routes 410-418. The carriers, shippers, industries and load types can influence or impact the routes 410-418 for various reasons.

For example, the specific industry and/or type of a load can have specific requirements, preferences, or regulations that can influence the route for that load, such as specific temperature, climate, lane, geographic, regional, timing, zoning (e.g., rural, urban, etc.), handling, and/or other requirements, preferences or regulations. As another example, the specific shipper and/or carrier of a load can have specific requirements, preferences, regulations, historical patterns, constraints, and/or other conditions or characteristics that may influence the route for a load. Thus, these example factors can lead to different predicted routes for a load. Such predicted routes can reflect the most likely/ probable route or trajectory estimated for a respective load and/or the route or trajectory estimated to yield the best performance (e.g., best timing, best cost, best reliability, safest, etc.) for the respective load.

In some examples, the predictive visibility system 100 can estimate a single route for each load. For example, the predictive visibility system 100 can estimate the most likely/ probably and/or highest performing route for a load. In other examples, the predictive visibility system 100 can estimate multiple routes for each load. For example, the predictive visibility system 100 can predict multiple alternative routes for a load estimated to have specific characteristics, such as specific performance characteristics, specific probabilities, specific preferences, etc. In some cases, the predictive visibility system 100 can rank or prioritize the multiple alternative routes and provide such rankings or priorities and/or use them to select a single route for the load.

In some cases, the predictive visibility system 100 can present or make available additional information about the routes 410-418. For example, the predictive visibility system 100 can provide statistics, probabilities, characteristics, descriptions, predictions, etc., for the routes 410-418 and/or one or more points/locations along the routes 410-418. In some examples, the routes 410-418 presented on the map 402 can be interactive. For example, a user can select a route or a point in a route to access additional information about that route or point in the route, such as location information, path information, descriptions, landmarks, statistics, events, conditions (e.g., traffic, weather, temperature, lane closings, etc.), zoning information, landscape information, estimated times (e.g., time of arrival, duration, distance, etc.), map information, etc. The predictive visibility system 100 can then present or render such information. As another example, the user can select a route or point in a route to configure a specific action associated with that route or point in the route. To illustrate, the user can select a point along a route to configure a status check or ping when the load is predicted and/or observed at that point along the route.

In some examples, the predictive visibility system 100 can update or change a route after a trip has started even without additional location information for the load. For example, the predictive visibility system 100 can recalculate a route prediction based on load attributes and/or events associated with a route and without location updates (e.g., GPS or ELD updates) or an indication from the carrier of the carrier's current location and/or intended route, to predict a different or updated route.

Figure 5A:
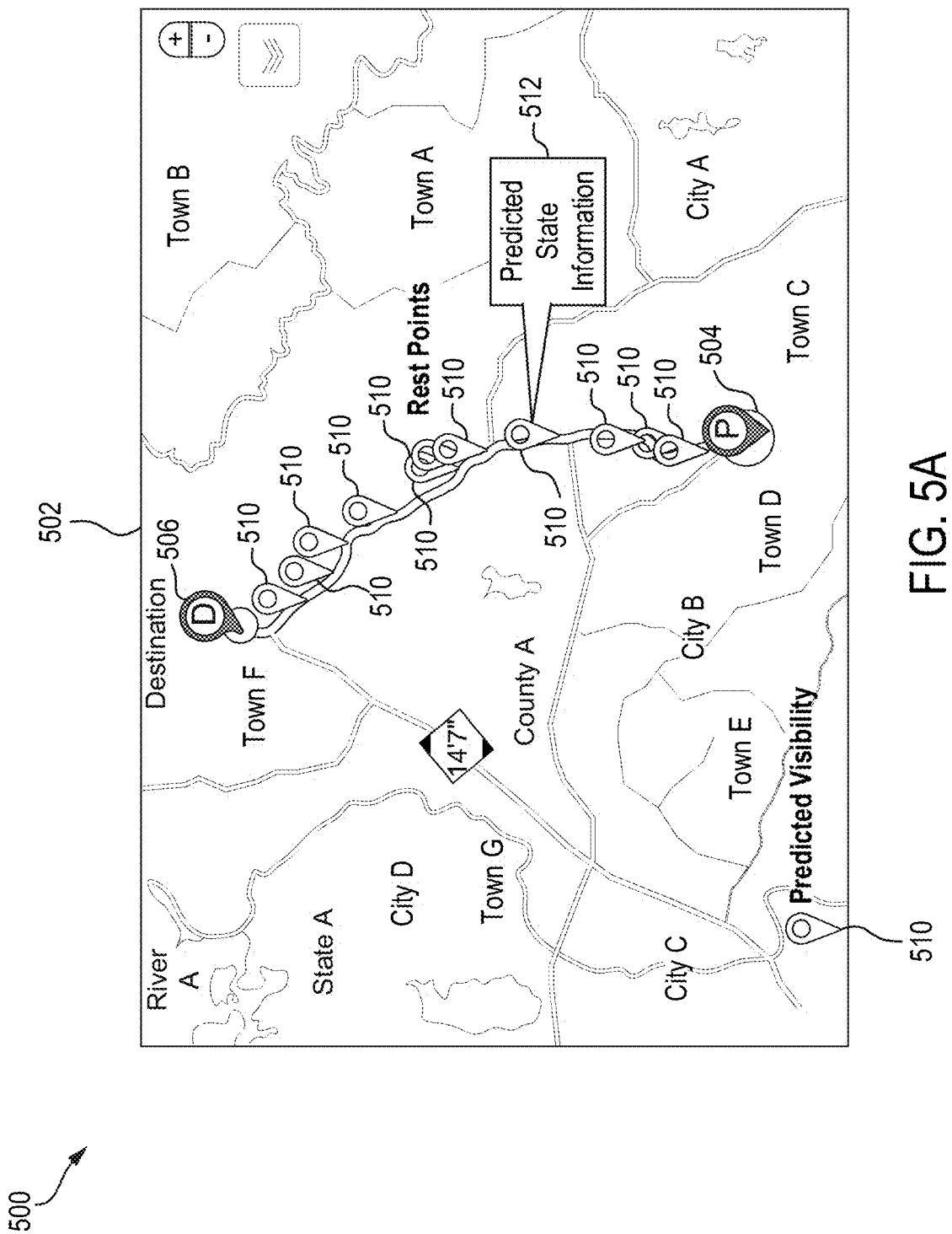
FIG. 5A illustrates an example map displaying objects corresponding to predicted visibility information calculated in a fully constrained environment, in accordance with some examples of the present disclosure.

FIG. 5A illustrates an example map 502 displaying objects 510 corresponding to predicted visibility information calculated in a fully constrained environment. As used herein, a fully constrained environment can include an environment and/or scenario where actual visibility information for a load is unavailable. Actual visibility information can include real, observed and/or real-time data about the carrier and/or load, such as location updates from a device (e.g., location updates from a GPS and/or ELD device), location updates from a carrier of the load, updates from a carrier of the load indicating an intended trajectory or behavior (e.g., stopping, resting, changing course, etc.) of the carrier. In some examples, actual visibility information can include real-time data about the carrier, such as real-time data about a location of the carrier, a status of the carrier, a behavior of the carrier, a trajectory of the carrier, an intended behavior and/or trajectory of the carrier, the load carried by the carrier, etc. Such actual visibility information can be unavailable due to one or more reasons such as, for example, communication failures/issues, system failures/issues, incorrect/noisy data points, operational issues, unfavorable weather conditions, etc.

The predicted visibility information can be calculated by the predictive visibility system 100 despite the lack of actual visibility information in the fully constrained environment. Thus, the predictive visibility system 100 can calculate the predicted visibility information despite a lack of observed location data points and an indication from the carrier of the carrier's current and intended/future location and trajectory. The objects 510 displayed on the map 502 can represent, contain, and/or provide the predicted visibility information.

In some cases, predicted visibility information associated with the objects 510 can be calculated for one or more points (e.g., locations, regions, landmarks, etc.) along a route from an origin location 504 of a load to a destination 506 of the load. For example, predicted visibility information can be calculated for or at various points on the map 502 and along the route from the origin location 504 to the destination location 506. The objects 510 can be displayed at such points on the map 502 and can reflect and/or provide respective predicted visibility information calculated for the points on the map 502 where such objects 510 are presented. Predicted visibility information associated with an object (510) and calculated for a point along a route or the route as a whole can include, for example, an indication of a predicted location of the load at a future time, an indication of a predicted behavior (e.g., stopping at a rest point, changing course, refueling, accelerating, decelerating, etc.) of the carrier at a future time, a predicted time of arrival of the load at the destination 506 and/or one or more future locations, a predicted event associated with the trip (e.g., a delay, a change of course, etc.), etc.

As previously noted, predicted visibility information can be calculated for one or more points along a route and reflected or provided by objects 510 associated with those points and their corresponding predicted visibility information. In some examples, predicted visibility information can be calculated for or at specific time times and/or time intervals (e.g., every n number of seconds, minutes, hours, days, etc.), for or at specific future predicted locations along the path, for or at specific estimated distances traveled, for or at specific events (e.g., weather events, traffic events, local events, etc.), and/or at any other points or periods. An object 510 can then be displayed on the map 502 at each point associated with the predicted visibility information calculated. The object 510 can provide respective, predicted visibility information calculated for the point on the map 502 where the object 510 is displayed.

For example, if predicted visibility information is calculated for every 15 minutes along a route, an object 510 containing and/or reflecting the predicted visibility information calculated at or for each of the 15 minute increments can be displayed on the map 502. Such object 510 can be displayed at a specific location along the map 502 corresponding to when the predicted visibility information associated with that object 510 was calculated or a predicted location (e.g., an estimated location at a future time) included in the predicted visibility information.

The objects 510 can include any visual/graphical objects rendered on the map 502, such as a pin, a tag, a cloud, a note, a frame or interface element, a thumbnail, a notification, a message, a link, a visual pattern, a shape, etc. In the example shown in FIG. 5A, the objects 510 are illustrated as pins dropped on the map 502.

In some examples, the objects 510 can be interactive. For example, a user can select an object 510 to request, receive, access, and/or display additional predicted visibility information associated with that object 510. To illustrate, a user can select an object 510 to trigger a presentation of a pop-up window 512 presenting the additional predicted visibility information associated with that object 510. The additional predicted visibility information can include, for example, predicted state information (e.g., location details, trajectory details, carrier status, load status, logged events and/or activity, etc.), notifications, alerts, carrier information, load information, a timestamp, etc.

Figure 5B:
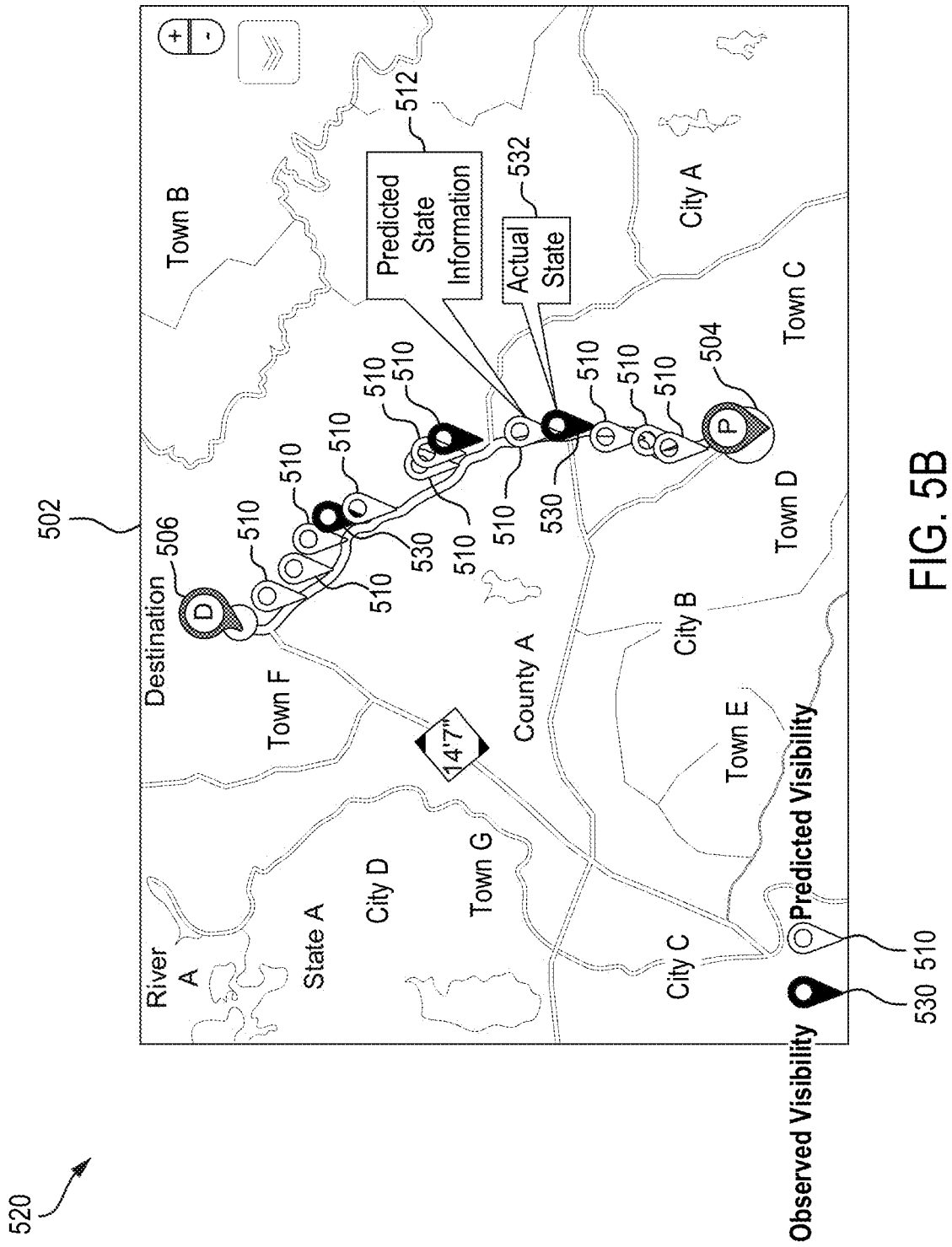
FIG. 5B illustrates an example map displaying objects corresponding to predicted and actual visibility information calculated in a partially constrained environment, in accordance with some examples of the present disclosure.

With reference to FIG. 5B, in addition to displaying objects 510 corresponding to predicted visibility information, in some cases involving a partially constrained environment, the map 502 can also display objects 530 corresponding to actual visibility information.

As used herein, a partially constrained environment can include an environment and/or scenario where only partial (or limited) actual visibility information for a load is available. For example, in a partially constrained environment, the predictive visibility system 100 may obtain one or more updates from a device or carrier (e.g., location updates, indications of an actual or intended trajectory or behavior, etc.) but may not have sufficient updates to determine an actual and/or intended route, trajectory, and/or behavior of the load (or the carrier of the load) for (or during) one or more segments of a route to be able to track or observe an actual/real/observed route, trajectory, and/or behavior of the carrier of the load (and the load). As another example, in a partially constrained environment, the predictive visibility system 100 may only be able to obtain real-time data about the carrier at limited times during the trip.

However, as described herein, despite the partial (or limited) availability of actual information in the partially constrained environment, the predictive visibility system 100 can nevertheless predict the route (or any portions thereof), trajectory (or any portions thereof), and/or behavior/pattern of a carrier and the load carried by the carrier for any portions of the route of the load lacking actual visibility information, any periods during the trip lacking visibility information, and/or the route or trip as a whole. In some examples, the predictive visibility system 100 can use the AI/ML engine 122 to make such predictions based on any of the various factors/attributes described herein. The predictive visibility system 100 can then provide the predicted visibility information calculated via a map (502) as shown in FIG. 5B.

As illustrated in FIG. 5B, in addition to displaying objects 510 corresponding to predicted visibility information on the map 502, the predictive visibility system 100 can also display objects 530 corresponding to actual visibility information. In some cases, actual visibility information associated with the objects 530 can be obtained (e.g., from one or more devices and/or the carrier) when the carrier of the load is at one or more points (e.g., locations, regions, landmarks, etc.) along a route. The objects 530 can be displayed at such points on the map 502 and can reflect and/or provide respective actual visibility information associated with those points on the map 502. In some cases, actual visibility information associated with the objects 530 can alternatively or additionally be obtained at certain periods or intervals of time during the trip. The objects 530 can be displayed at points on the map 502 corresponding to the actual location of the carrier on the map 502 as identified in the actual visibility information associated with such objects 530.

Actual visibility information associated with an object (530) can include real and/or observed measurements or state information such as GPS measurements, ELD data, updates reported by the carrier, etc. In some cases, actual visibility information can include, for example, an indication of an actual/observed location of a load at a specific time, an indication of an actual/observed behavior (e.g., stopping at a rest point, changing course, refueling, accelerating, decelerating, etc.) of the carrier at a specific time, an actual/observed real trajectory of the carrier/load, an actual/observed event that occurred during the trip (e.g., a delay, a change of course, a crash, etc.), etc.

As previously noted, actual visibility information can be obtained when the carrier of the load is located at (or passing) one or more points along a route, at specific time times and/or time intervals (e.g., every n number of seconds, minutes, hours, days, etc.) during the trip, at specific events (e.g., weather events, traffic events, local events, etc.) during the trip, and/or at any other time when actual visibility information is available and/or accessible (e.g., when the carrier, a location sensor and/or a location device such as a GPS or ELD device can communicate with the predictive visibility system 100).

An object 530 can then be displayed on the map 502 at each point associated with the actual visibility information. The object 530 can provide respective, actual visibility information at that point on the map 502 where the object 530 is displayed. For example, if actual visibility information is obtained from the carrier or a GPS device of the carrier at locations A, B, and C along a route, an object 530 containing and/or reflecting the actual visibility information for locations A, B, and C can be displayed on the map 502 at points on the map 502 corresponding to locations A, B, and C.

The objects 530 can include any visual/graphical objects rendered on the map 502, such as a pin, a tag, a cloud, a note, a frame or interface element, a thumbnail, a notification, a message, a link, a visual pattern, a shape, etc. In the example shown in FIG. 5B, the objects 530 are illustrated as pins dropped on the map 502.

In some examples, the objects 530 can be interactive. For example, a user can select an object 530 to request, receive, access, and/or display actual visibility information associated with that object 530. To illustrate, a user can select an object 530 to trigger a presentation of a pop-up window 532 presenting the actual visibility information associated with that object 530 (and/or the location on the map 502 where the object 530 is displayed). The actual visibility information provided in pop-up window 532 can include, for example, an actual/observed state (e.g., location, trajectory, carrier status, load status, logged events and/or activity, etc.), notifications, alerts, carrier information, load information, a timestamp, etc.

In some cases, the predictive visibility system 100 can provide information comparing and/or combining actual visibility information and predicted visibility information. For example, the predictive visibility system 100 can provide an indication of one or more actual/observed locations of the carrier of the load and an indication of one or more predicted locations of the carrier of the load before and/or after the one or more actual/observed locations of the carrier of the load.

Figure 6:
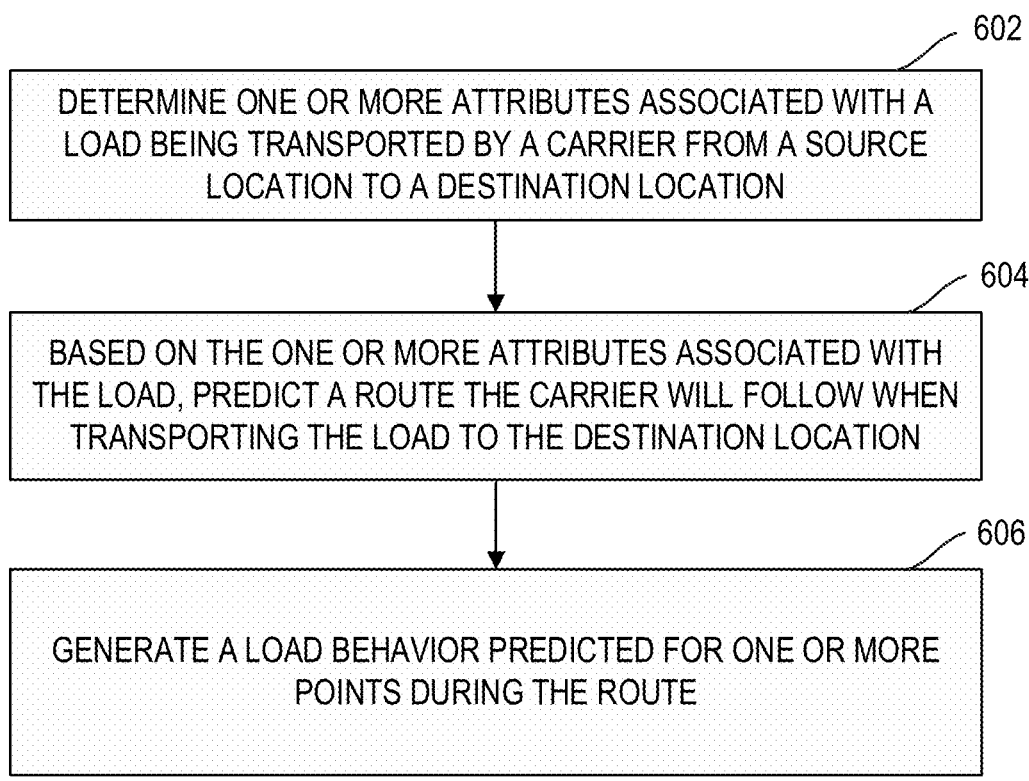
FIG. 6 illustrates an example method for predicting and providing supply chain visibility, in accordance with some examples of the present disclosure.

Having disclosed example systems and concepts, the disclosure now turns to the example method 600 for predicting and providing supply chain visibility shown in FIG. 6. The steps outlined herein are examples and can be implemented in any combination thereof, including combinations that exclude, add, or modify certain steps.

At block 602, the method 600 can include determining (e.g., via the predictive visibility system 100), one or more attributes associated with a load being transported by a carrier from a source location (e.g., 404, 504) to a destination location (e.g., 406, 506). In some examples, the one or more attributes can include an identity of the carrier, an identity of an industry (e.g., food, pharmaceutical, fertilizer, agriculture, aviation, etc.) associated with the load, an identity of a shipper of the load, one or more load characteristics (e.g., weight, size, shape, type of load, load restrictions, load delivery requirements, load handling requirements, load preferences, shipment priority, appointment time, etc.), and/or a pickup time associated with the load (e.g., a day/time when the carrier picked up the load).

In some examples, the one or more attributes can include other information about the carrier, the shipper, and/or the industry such as preferences, a profile, statistics, descriptive details, contractual details, regulatory details, constraints, etc. In some cases, the one or more load characteristics can include a type of load, a load weight, and/or a transportation requirement associated with the load. For example, in some cases, the one or more attributes can include an appointment time, a transportation vehicle (e.g., a truck, a trailer, etc.), a shipment priority, a pallet weight and/or size, a type of good, origin and/or destination attributes (e.g., a city, state, country, facility, business hours, etc.), a weather and/or traffic pattern, a historic usage of different lanes, a driver's driving and/or resting pattern in those lanes, business hours at an origin and/or destination, business hours at a stop or rest location, a total distance of a lane from the source to destination location, etc.

At block 604, the method 600 can include predicting (e.g., via the predictive visibility system 100), based on the one or more attributes associated with the load, a route (e.g., 410, 412, 414, 416, 418) the carrier will follow when transporting the load to the destination location. In some cases, the route can be predicted using sequence modelling, learning, prediction (e.g., using AI), and/or other techniques. In some examples, the route can be predicted using Markov chains, tensor factorization, dynamic Bayesian networks, conditional random fields, etc. In other cases, the route can be predicted using one or more neural networks, such as a recurrent neural network.

In some examples, at least a portion of the route is predicted without data indicating an actual presence (e.g., an observed location, a current location, a reported location, etc.) of the carrier and load within the portion of the route. The portion of the route can include one or more segments of the route, one or more points and/or locations within the route, one or more paths within the route, and/or any other part of the route.

Moreover, in some examples, the data indicating the actual presence of the carrier and load can include location measurements from a device (e.g., a GPS device, an ELD, a sensor, etc.) associated with the carrier and/or a location update from the carrier (and/or any other party having knowledge of, and/or observed, a location of the carrier. In some cases, the location measurements can include GPS measurements, ELD data, phone triangulation values, sensor measurements, and/or any other types of measurements derived from data associated with a device. In some examples, a location update from the carrier can be an electronic message provided by the carrier, a voice message provided by the carrier (e.g., via a call or a voice communication), a text message provided by the carrier, and/or any other location information reported by the carrier.

In some cases, at least the portion of the route can be predicted without real-time (or substantially near real-time) data about the carrier, such as real-time data about a location of the carrier, a behavior of the carrier, a trajectory of the carrier, an intended behavior and/or trajectory of the carrier, the load, a status of a vehicle used by the carrier, etc.

In some cases, the route and/or any portion of the route can include a fully-constrained or partially-constrained environment. For example, in some cases, the portion of the route can include a fully-constrained environment, which can include an area where observed location information for the carrier is lacking. The observed location information can include, for example, the data indicating the actual presence of the carrier and load, such as a real-time location information about the carrier.

At block 606, the method 600 can include generating (e.g., via the predictive visibility system 100) a load behavior predicted for one or more points during the route. For example, the method 600 can predict a future load behavior at one or more points (e.g., locations, periods of time, etc.) along the route. The load behavior can include predicted visibility information, as previously described. For example, in some cases, the load behavior can include one or more predicted locations of the load along the route at one or more times/periods during a trip of the load, an estimated time at which the load is predicted to arrive at the one or more locations along the route, an estimated time at which the load is predicted to arrive at the destination, etc.

In some aspects, generating the load behavior predicted for one or more points during the route can include predicting, based on the one or more attributes, a behavior of the carrier at one or more future times while transporting the load to the destination location and providing, via a load tracking interface, an indication of the predicted behavior of the carrier at the one or more future times. For example, the predictive visibility system 100 can predict a behavior of the carrier and provide on the load tracking interface a rendering, preview, visualization and/or description of the predicted behavior.

In some examples, the predicted behavior of the carrier at the one or more future times can include stopping at one or more locations (e.g., rest points, fueling stations, lodging facilities, eating facilities, intermediary stopping or load pickup points, etc.), traveling at a predicted speed, changing a traveling velocity, changing a traveling trajectory (e.g., performing a u-turn, egressing a highway, turning to a different road/street, rerouting to an alternate/different path, etc.), a location of the carrier (and the load) at one or more points (e.g., times, periods, intervals, etc.) along the route, and/or any other traveling behavior and/or load status. Moreover, in some cases, the predicted behavior can be predicted using additional information such as, for example, news reports, actual/observed location and/or behavior updates previously obtained, route statistics, geographic information, weather information, traffic information, map information, etc.

In some cases, the load behavior can be predicted using sequence modelling, learning, prediction (e.g., using AI), and/or other techniques. In some examples, the load behavior can be predicted using Markov chains, tensor factorization, dynamic Bayesian networks, conditional random fields, etc. In other cases, the load behavior can be predicted using one or more neural networks, such as a recurrent neural network.

In some aspects, the method 600 can include predicting, based on the one or more attributes, a time of arrival of the load at the destination location and providing, via a load tracking interface, the time of arrival of the load predicted. In some cases, the time of arrival can be predicted using additional information such as, for example, news reports, actual/observed location updates previously obtained, route statistics, geographic information, weather information, traffic information, map information, etc. In some examples, predicting the route and/or the load behavior can be based at least partly on historical data. The historical data can be associated with the identity of the carrier, the identity of the industry associated with the load, the identity of the shipper of the load, the one or more load characteristics, etc. For example, the historical information can include statistics or logged histories for the carrier, the industry, the shipper, and/or the one or more load characteristics.

In some cases, the method 600 can include generating a load tracking interface that identifies the route the carrier is predicted to follow when transporting the load to the destination location and/or the predicted load behavior. In some examples, the load tracking interface can include a map (e.g., map 402, map 502) displaying the route the carrier is predicted to follow when transporting the load to the destination location and/or the predicted load behavior. In some cases, the load tracking interface can include a web page, a graphical user interface, a window, and/or any other content display. Moreover, in some examples, the load tracking interface can display tables, charts, lists, messages, statistics, profile information, load information, trip information, alerts, route visualizations, visualization of actions or patterns, descriptions or depictions of events, descriptions or depictions of conditions, video content, files, and/or any other type of content or format.

Figure 7:
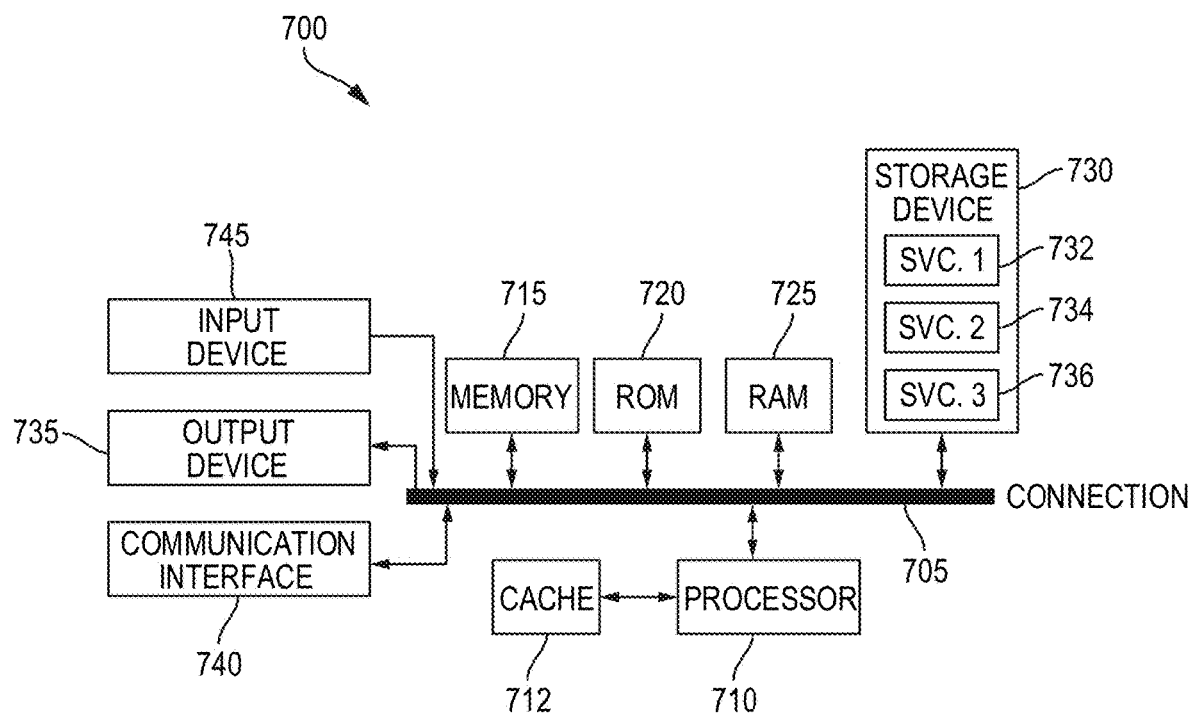
FIG. 7 illustrates an example computing device architecture, in accordance with some examples of the present disclosure.

FIG. 7 illustrates an example computing device architecture of an example computing device 700 which can implement the various techniques described herein. For example, the computing device 700 can implement the predictive visibility system 100 shown in FIG. 1 and perform the supply chain visibility techniques described herein.

The components of the computing device 700 are shown in electrical communication with each other using a connection 705, such as a bus. The example computing device 700 includes a processing unit (CPU or processor) 710 and a computing device connection 705 that couples various computing device components including the computing device memory 715, such as read only memory (ROM) 720 and random access memory (RAM) 725, to the processor 710. The computing device 700 can include a cache of high-speed memory connected directly with, in close proximity to, or integrated as part of the processor 710. The computing device 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions.

Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is connected to another component either directly or indirectly, and/or any component that is in communication with another component (e.g., connected to the other component over a wired or wireless connection, and/or other suitable communication interface) either directly or indirectly.

Claim language or other language reciting "at least one of" a set or "one or more of a set" indicates that one member of the set or multiple members of the set (in any combination) satisfy the claim. For example, claim language reciting "at least one of A and B" means A, B, or A and B. In another example, claim language reciting "one or more of A and B" means A, B, or A and B. In another example, claim language reciting "one or more of A, B, and C" means A, B, C, A and B, A and C, B and C, or all of A, B, and C.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method comprising:
receiving, by a predictive visibility system, location data from one or more devices tracking a current location of a load being transported by a carrier from a source location to a destination location, the location data indicating the current location of the load;
Detecting, by the predictive visibility system, a communication error between the predictive visibility system and the one or more devices tracking the current location of the load;
determining, by the predictive visibility system, one or more predicted locations of the load during the communication error and while the predictive visibility system is unable to receive additional location data from the one or more devices, wherein the one or more predicted locations of the load are determined based on one or more attributes associated with the load; and
generating, by the predictive visibility system, a load tracking interface that identifies the current location of the load at a first time and the one or more predicted locations of the load at one or more additional times;
providing, to the load tracking interface, a trajectory of the load from the current location to the destination location, the trajectory of the load being based on the one or more predicted locations of the load and the destination location.

2. The method of claim 1, wherein the trajectory of the load is further based on the one or more attributes associated with the load.

3. The method of claim 1, further comprising:
providing, to the load tracking interface, a first indication that the current location of the load comprises an observed location and a second indication that the one or more predicted locations of the load are location predictions.

4. The method of claim 1, further comprising:
determining, by the predictive visibility system, a predicted route the carrier is predicted to follow when transporting the load to the destination location; and
providing, to the load tracking interface, an indication of the predicted route the carrier is predicted to follow.

5. The method of claim 4, wherein the predicted route is determined during the communication error and while the predictive visibility system is unable to receive additional location data from the one or more devices, and wherein the predicted route is determined based on the one or more attributes associated with the load and the destination location.

6. The method of claim 1, wherein the one or more attributes comprise at least one of an identity of the carrier, a seasonality, an identity of an industry associated with the load, an identity of a shipper of the load, one or more load characteristics, and a pickup time associated with the load.

7. The method of claim 6, wherein the one or more load characteristics comprise at least one of a type of load, a load weight, and a transportation requirement associated with the load.

8. The method of claim 1, wherein the load tracking interface comprises a map displaying the current location of the load at the first time and the one or more predicted locations of the load at the one or more additional times.

9. The method of claim 1, further comprising:
based on the one or more attributes, predicting a behavior of the carrier at one or more future times while transporting the load to the destination location; and
providing, to the load tracking interface, an indication of the predicted behavior of the carrier at the one or more future times.

10. The method of claim 9, wherein the predicted behavior of the carrier at the one or more future times comprises at least one of stopping at one or more locations, traveling at a predicted speed, changing a traveling velocity and changing a traveling trajectory.

11. A system comprising:
one or more processors; and
a computer-readable storage medium having stored thereon instructions that, when executed by the one or more processors, cause the system to:
receive location data from one or more devices tracking a current location of a load being transported by a carrier from a source location to a destination location, the location data indicating the current location of the load;
detect a communication error between the system and the one or more devices tracking the current location of the load;
determine one or more predicted locations of the load during the communication error and while the system is unable to receive additional location data from the one or more devices, wherein the one or more predicted locations of the load are determined based on one or more attributes associated with the load; and
generate a load tracking interface that identifies the current location of the load at a first time and the one or more predicted locations of the load at one or more additional times;
provide, to the load tracking interface, a trajectory of the load from the current location to the destination location, the trajectory of the load being based on the one or more predicted locations of the load and the destination location.

12. The system of claim 11, the computer-readable storage medium having stored thereon instructions that, when executed by the one or more processors, cause the system to:
determine a predicted route the carrier is predicted to follow when transporting the load to the destination location; and
provide, to the load tracking interface, an indication of the predicted route the carrier is predicted to follow.

13. The system of claim 12, wherein the predicted route is determined during the communication error and while the system is unable to receive additional location data from the one or more devices, and wherein the predicted route is determined based on the one or more attributes associated with the load and the destination location.

14. The system of claim 11, wherein the one or more attributes comprise at least one of an identity of the carrier, a seasonality, an identity of an industry associated with the load, an identity of a shipper of the load, one or more load characteristics, and a pickup time associated with the load.

15. The system of claim 14, wherein the one or more load characteristics comprise at least one of a type of load, a load weight, and a transportation requirement associated with the load.

16. The system of claim 11, wherein the load tracking interface comprises a map displaying the current location of the load at the first time and the one or more predicted locations of the load at the one or more additional times.

17. The system of claim 11, the computer-readable storage medium having stored thereon instructions that, when executed by the one or more processors, cause the system to:
based on the one or more attributes, predict behavior of the carrier at one or more future times while transporting the load to the destination location; and
provide, to the load tracking interface, an indication of the predicted behavior of the carrier at the one or more future times, wherein the predicted behavior of the carrier at the one or more future times comprises at least one of stopping at one or more locations, traveling at a predicted speed, changing a traveling velocity and changing a traveling trajectory.

18. A non-transitory computer-readable storage medium comprising: instructions that, when executed by one or more processors, cause the one or more processors to:
receive, via a predictive visibility system, location data from one or more devices tracking a current location of a load being transported by a carrier from a source location to a destination location, the location data indicating the current location of the load;
detect a communication error between the predictive visibility system and the one or more devices tracking the current location of the carrier;
determine one or more predicted locations of the load during the communication error and while the predictive visibility system is unable to receive additional location data from the one or more devices, wherein the one or more predicted locations of the load are determined based on one or more attributes associated with the load;

generate a load tracking interface that identifies the current location of the load at a first time and the one or more predicted locations of the load at one or more additional times; and provide, to the load tracking interface, a trajectory of the load from the current location to the destination location, the trajectory of the load being based on the one or more predicted locations of the load and the destination location.

* * * * *